United States Patent
Chiang et al.

(10) Patent No.: US 7,675,246 B2
(45) Date of Patent: Mar. 9, 2010

(54) DRIVING CIRCUIT AND RELATED DRIVING METHOD FOR PROVIDING FEEDBACK CONTROL AND OPEN-CIRCUIT PROTECTION

(75) Inventors: Yung-Hsin Chiang, Taipei County (TW); Shih-Yuan Wang, Tai-Nan (TW)

(73) Assignee: ADDtek Corp., Songshan District, Taipei (TW)

( * ) Notice: Subject to any disclaimer, the term of this patent is extended or adjusted under 35 U.S.C. 154(b) by 400 days.

(21) Appl. No.: 11/675,094

(22) Filed: Feb. 15, 2007

(65) Prior Publication Data

US 2008/0144236 A1 Jun. 19, 2008

Related U.S. Application Data

(60) Provisional application No. 60/870,410, filed on Dec. 18, 2006.

(51) Int. Cl.
*H05B 37/02* (2006.01)

(52) U.S. Cl. ......................... 315/291; 315/307; 315/312

(58) Field of Classification Search ............. 315/209 R, 315/224–226, 291, 307, 185 R, 247, 294, 315/308, 312
See application file for complete search history.

(56) References Cited

U.S. PATENT DOCUMENTS 5,572,112 A * 11/1996 Saeki et al. ................. 323/282
6,538,394 B2 * 3/2003 Hurtz et al. ................. 315/291
7,436,378 B2 * 10/2008 Ito et al. ....................... 345/82
7,550,934 B1 * 6/2009 Deng et al. ................. 315/308

FOREIGN PATENT DOCUMENTS

TW           I270219           1/2007

* cited by examiner

*Primary Examiner*—Douglas W Owens
*Assistant Examiner*—Jimmy T Vu
(74) *Attorney, Agent, or Firm*—Winston Hsu

(57) ABSTRACT

A driving circuit includes at least one light-emitting device, a voltage regulator circuit, an analysis and decision circuit, and a selecting circuit. The voltage regulator circuit is coupled to the light-emitting device for providing a driving voltage to drive the light-emitting device. The analysis and decision circuit is coupled to the light-emitting device for determining whether the light-emitting device is open-circuited to generate a decision result. The selecting circuit is coupled between the analysis and decision circuit and the voltage regulator circuit for selecting a maximum forward bias voltage corresponding to the light-emitting device to generate a feedback signal according to the decision result and for transmitting the feedback signal to the voltage regulator circuit. The voltage regulator circuit adjusts the driving voltage according to the feedback signal.

18 Claims, 8 Drawing Sheets

DRIVING CIRCUIT AND RELATED DRIVING METHOD FOR PROVIDING FEEDBACK CONTROL AND OPEN-CIRCUIT PROTECTION

CROSS REFERENCE TO RELATED APPLICATIONS

This application claims the benefit of U.S. Provisional Application No. 60/870,410, filed Dec. 18, 2006, and included herein by reference.

BACKGROUND OF THE INVENTION

1. Field of the Invention

The invention relates to a driving circuit and related method for providing feedback control and open-circuit protection, and more particularly, to a driving circuit and related method utilizing an analysis and decision circuit to detect status of light-emitting devices for providing feedback control and open-circuit protection.

2. Description of the Prior Art

Currently, light emitting diodes (LEDs) are developed and applied to backlight modules for replacing conventional CCFLs since LEDs have advantages of small size and low power consumption. Light emitting diodes have found a myriad of applications in many electrical circuits produced for consumer, commercial, industrial, and military uses. LEDs are semiconductor devices that convert electrical energy directly into light, and, like many other electrical components, are susceptible to damage or destruction when exposed to excessive currents or voltages. When the need arises, circuits can be designed to provide protection to devices that may encounter over-currents and over-voltages. LEDs are often used as light indicators or other light sources for portable electronic devices such as mobile phones, notebook computers, and personal digital assistants (PDAs). However, there have been increasing demands for LEDs to be applied to larger displays such as large neon signs. Such applications require many LEDs for producing a sufficient amount of light. Since the forward-biased current of an LED increases exponentially with the applied forward-biased voltage, it is desirable to drive LEDs with current sources to achieve matching luminance of different LEDs.

Please refer to FIG. 1. FIG. 1 is a diagram of a conventional driving circuit 100 in the prior art. The driving circuit 100 includes a voltage regulator circuit 110, a light-emitting device 120, and a constant-current supplier 130. The voltage regulator circuit 110 has a first input end 112 for receiving an input voltage $V_{IN}$, a second input end 114 for receiving a feedback signal FB, and an output end 116 coupled to an input end of the light-emitting device 120. The voltage regulator circuit 110 is used for providing a driving voltage $V_{DD}$ to the light-emitting device 120. The constant-current supplier 130 provides a constant current Ic for driving the light-emitting device 120. In otherwords, the constant-current supplier 130 can dynamically adjust an amount of luminance of the light-emitting device 120 according to adjustments in the current value of the constant current Ic.

As shown in FIG. 1, the light-emitting device 120 includes a plurality of light emitting diodes 140. Note that each light emitting diode 140 is referred to as a current driven device. Also, the luminance of the light emitting diode is proportional to the constant current Ic. That is, the luminance of each light emitting diode 140 increases as the constant current Ic increases. In general, to achieve a uniform luminance in the plurality of light emitting diodes 140 it is a matter of driving each current of the plurality of light emitting diodes 140 with a same current. To achieve the requirement of uniform luminance, the light emitting diodes 140 will be coupled in a series. That is, as more light emitting diodes 140 are coupled, a required forward bias voltage $V_f$ of the light-emitting device 120 grows. Therefore, the voltage regulator circuit 110 must provide more driving voltage $V_{DD}$ to supply the required forward bias voltage $V_f$ of the light-emitting device 120.

Please refer to FIG. 2. FIG. 2 is a diagram of a conventional driving circuit 200 in the prior art. The driving circuit 200 includes a voltage regulator circuit 210, six light-emitting devices 221-226, six constant-current suppliers 231-236, and a select circuit 250. The driving circuit 200 is similar to the driving circuit 100 in FIG. 1. The difference between them is that the driving circuit 200 is coupled to more light-emitting devices and further includes the select circuit 250. In this embodiment, there are six light-emitting devices 221-226, but can be expanded to even more or even less light-emitting devices. The voltage regulator circuit 210 is used for providing a driving voltage $V_{DD}$ to the six light-emitting device 221-226. The first constant-current supplier 231 provides a first constant current I1 for driving the first light-emitting device 221. To reason by analogy, the sixth constant-current supplier 236 provides a sixth constant current $I_6$ for driving the sixth light-emitting device 226.

However, due to limitations of the materials and the manufacturing process used for LEDs, the required forward bias voltage of each light emitting diode 240 is not identical. For example, consider that the first light-emitting device 221 includes three light emitting diodes 240. As is known, the required forward bias voltage of each light emitting diode 240 is not identical. Therefore, the six light-emitting devices 221-226 will have different forward bias voltages $V_{f1}$-$V_{f6}$. In this embodiment, the driving circuit 200 utilizes the select circuit 250 to select the smallest of six voltage levels $V_{drop1}$-$V_{drop6}$ to output a minimum voltage level $V_N$ to an input end 214 of the voltage regulator circuit 210. That is, to reduce the power consumption for each constant current supplier 231-236, and to ensure that all the six light-emitting device 221-226 can operate smoothly, the select circuit 250 thus selects the smallest of the six voltage levels $V_{drop1}$-$V_{drop6}$ to be a minimum voltage level $V_N$ (which are respectively corresponding to the biggest forward bias voltage of the voltage level $V_{f1}$-$V_{f6}$) to output the feedback signal FB.

Please refer to FIG. 1 and FIG. 2, the driving voltage $V_{DD}$ can be adjusted according to the feedback signal FB. If the driving circuit needs to drive a plurality of light-emitting devices, the select circuit 250 can select the smallest voltage levels $V_{drop1}$-$V_{drop6}$ to output a minimum voltage level $V_N$ to be the feedback signal FB. That is, to reduce the power consumption for each constant current supplier 231-236. Assuming that the second light-emitting device 222 is burned out (or an open-circuit), the select circuit 250 will always select the voltage level $V_{drop2}$ to be the feedback signal FB. Under this condition, the driving voltage $V_{DD}$ keeps raising all the time. If the driving voltage $V_{DD}$ is greater than a maximum value that the driving circuit 200 can bear, the whole driving circuit or its elements may become damaged.

SUMMARY OF THE INVENTION

It is an objective of the claimed disclosure to provide a driving circuit for providing feedback control and open-circuit protection.

According to an embodiment of the present disclosure, a driving circuit for providing feedback control and open-circuit protection is disclosed. The driving circuit includes at least one light-emitting device, a voltage regulator circuit, an analysis and decision circuit, and a selecting circuit. The voltage regulator circuit is coupled to the light-emitting device for providing a driving voltage to drive the light-emitting device. The analysis and decision circuit is coupled to the light-emitting device for determining whether the light-emitting device is open-circuited to generate a decision result. The selecting circuit is coupled between the analysis and decision circuit and the voltage regulator circuit for selecting a maximum forward bias voltage corresponding to the light-emitting device to generate a feedback signal according to the decision result and for transmitting the feedback signal to the voltage regulator circuit. The voltage regulator circuit adjusts the driving voltage according to the feedback signal.

In one embodiment, the light-emitting device comprises at least one light emitting diode (LED).

In one embodiment, the analysis and decision circuit includes a second comparator, at least one open-circuit detector, and a control logic. The second comparator is used for generating a second comparison signal. The open-circuit detector is used for detecting a status of the light-emitting device and for generating a detection signal. The control logic is used for generating the decision result according to the second comparison signal and the detection signal.

It is an objective of the claimed disclosure to provide a driving method for providing feedback control and open-circuit protection.

According to an embodiment of the present disclosure, a driving method for providing feedback control and open-circuit protection is disclosed. The driving method includes providing a driving voltage to drive at least one light-emitting device, determining whether the light-emitting device is open-circuit to generate a decision result, selecting a maximum forward bias voltage corresponding to the light-emitting device to generate a feedback signal according to the decision result, and adjusting the driving voltage according to the feedback signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
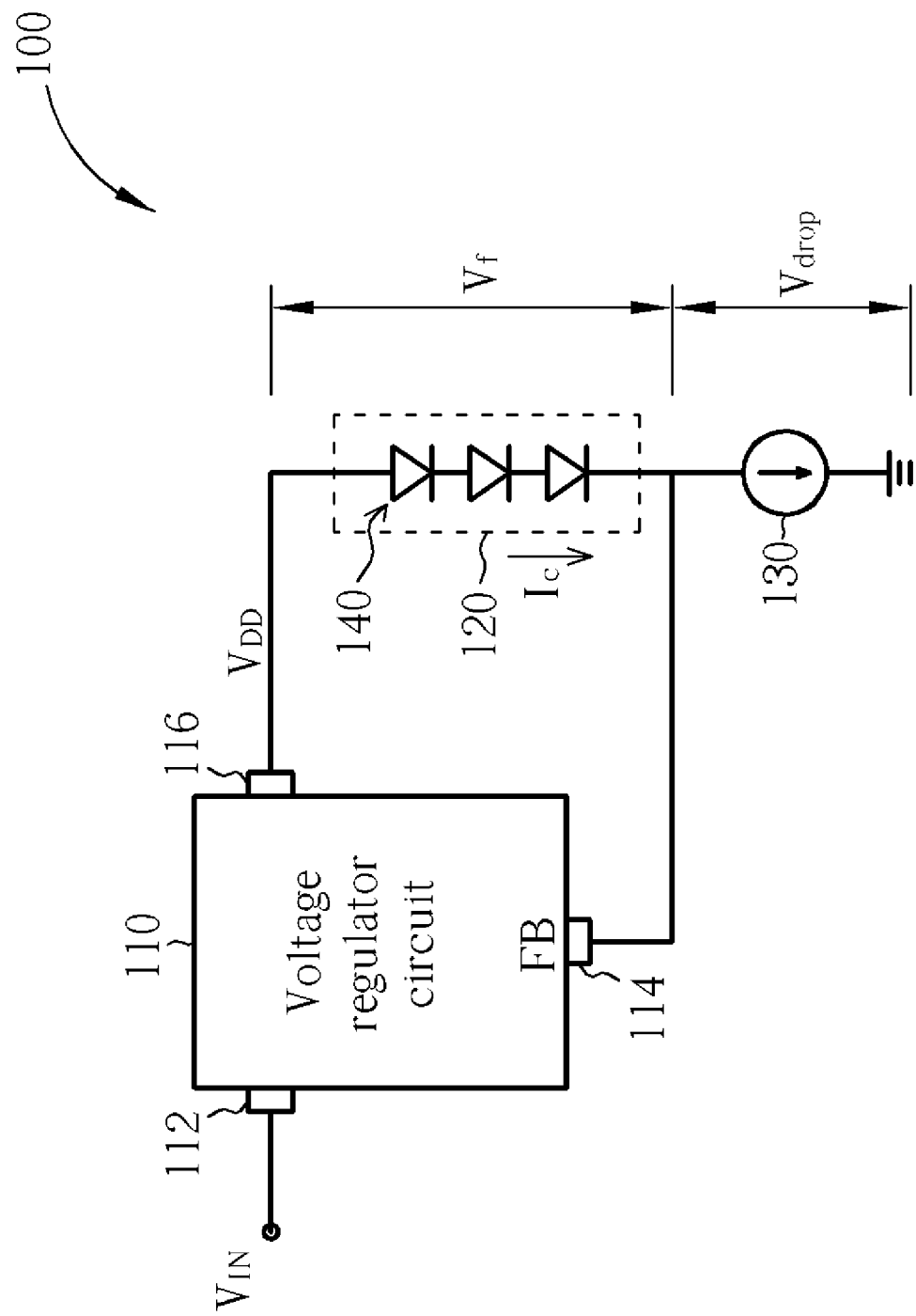
FIG. 1 is a diagram of a conventional driving circuit in the prior art.
Figure 2:
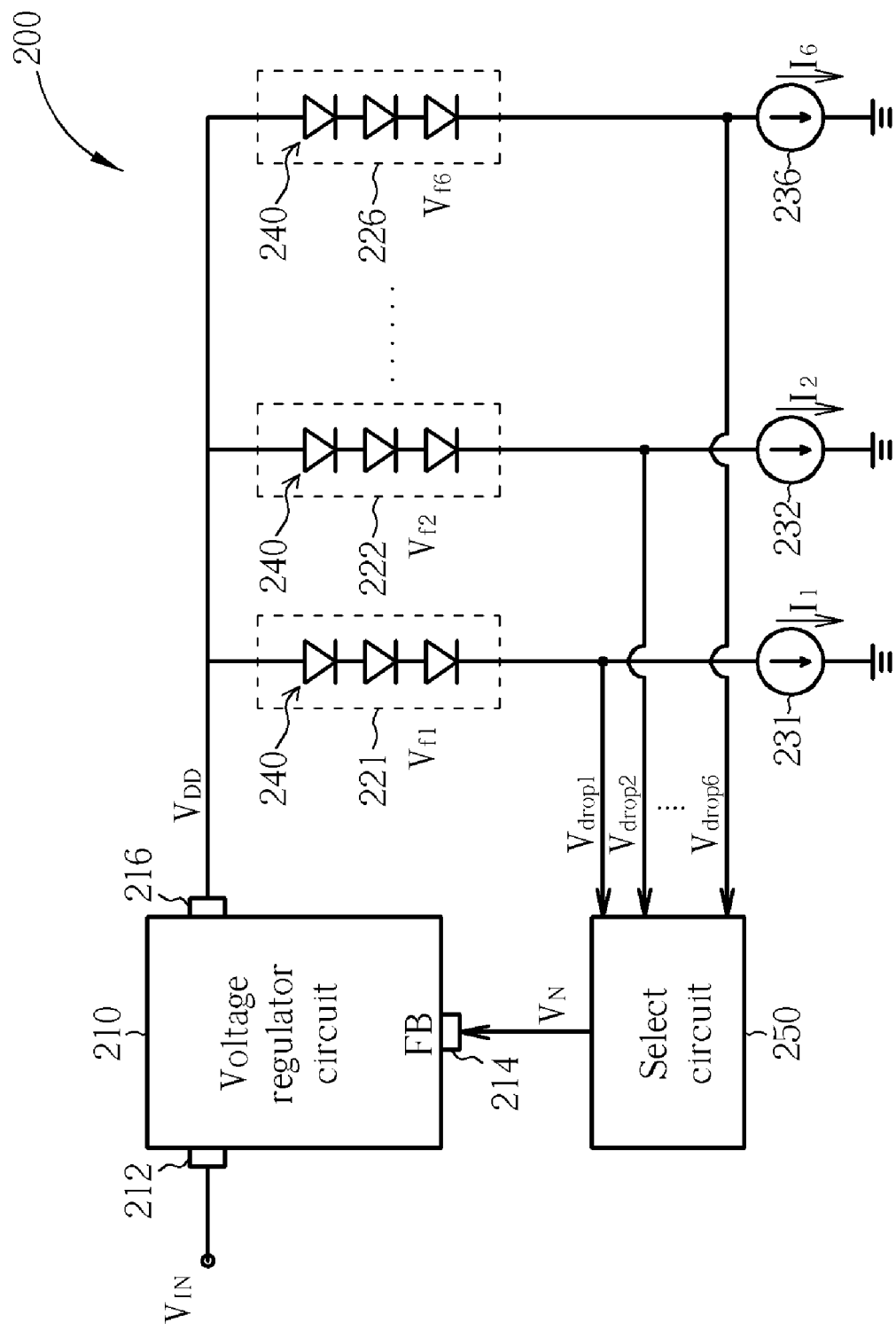
FIG. 2 is a diagram of another conventional driving circuit in the prior art.
Figure 3:
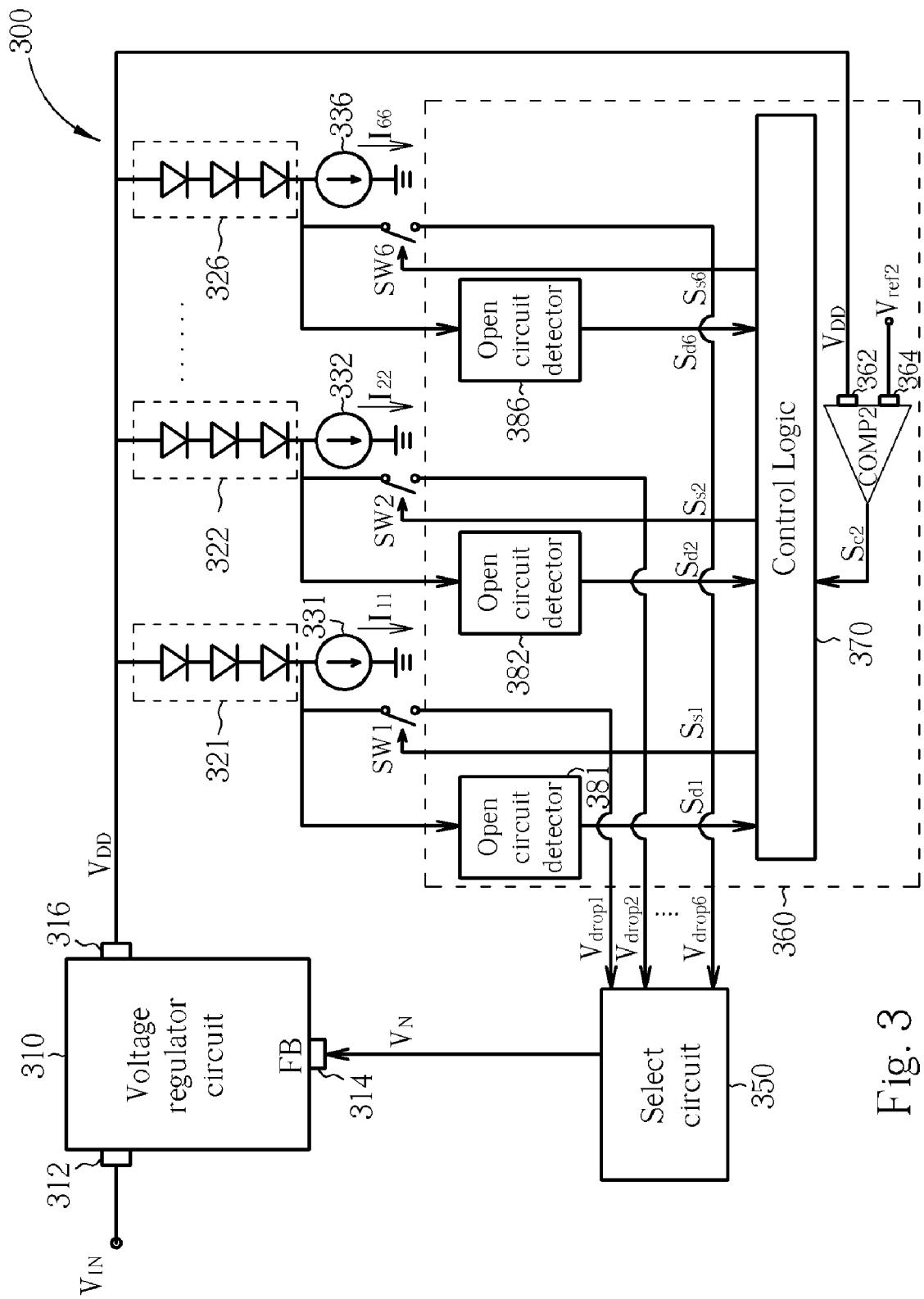
FIG. 3 is a diagram of a driving circuit for providing feedback control and open-circuit protection according to a first embodiment of the present invention.

Please refer to FIG. 3. FIG. 3 is a diagram of a driving circuit 300 for providing feedback control and open-circuit protection according to a first embodiment of the present invention. The driving circuit 300 includes a voltage regulator circuit 310, at least one light-emitting devices 321-326 (in this embodiment, the six light-emitting devices 321-326 are presented for illustration), at least one constant-current suppliers 331-336 (in this embodiment, the six constant-current suppliers 331-336 are presented for illustration), a select circuit 350, an analysis and decision circuit 360, and at least one switches SW1-SW6 (in this embodiment, the six switches SW1-SW6 are present for illustration). The voltage regulator circuit 310 has a first input end 312 for receiving an input voltage VIN, a second input end 314 for receiving a feedback signal FB, and an output end 316 that is coupled to the six light-emitting devices 321-326. The voltage regulator circuit 310 is used for providing a driving voltage VDD to all six light-emitting devices 321-326. The six constant-current suppliers 331-336 are individually used for providing a constant current for driving the corresponding light-emitting device. For example, the first constant-current supplier 331 provides a first constant current I1 to the first light-emitting device 321.

In this embodiment, the analysis and decision circuit 360 includes a second comparator COMP2, at least one open-circuit detectors 381-386 (in this embodiment, the six open-circuit detectors 381-386 are presented for illustration), and a control logic 370. The second comparator has a first input end 362 coupled to the output end 316 of the voltage regulator circuit 310 for receiving the driving voltage $V_{DD}$ and a second input end 364 for receiving a second reference voltage Vref2. The second comparator COMP2 compares the driving voltage $V_{DD}$ with the second reference voltage Vref2 to generate a second comparison signal Sc2. If the driving voltage $V_{DD}$ is greater than the second reference voltage Vref2, the analysis and decision circuit 360 will utilize the six open-circuit detectors 381-386 to detect a status of corresponding light-emitting device to generate the decision result. In other words, the six open-circuit detectors 381-386 detect the status of corresponding light-emitting device to output a corresponding detection signal Sd1-Sd6 to the control logic 370. Afterwards, the control logic 370 generates six switch control signals Ss1-Ss6 according to the second comparison signal $Sc_2$ and the six detection signals Sd1-Sd6 (i.e., the decision result) to control turning on or turning off the corresponding switches SW1-SW6.

Considering several conditions as follows. If the driving voltage $V_{DD}$ is lower than the second reference voltage Vref2, the control logic 370 will generate the six switch control signals Ss1-Ss6 to turn on all the six switches according to the second comparison signal $Sc_2$ and the six detection signals Sd1-Sd6 (i.e., the decision result). Under this situation, all the six voltage levels $V_{drop1}$-$V_{drop6}$ are transmitted to the select circuit 350. Afterwards, the select circuit 350 selects the smallest of the six voltage levels $V_{drop1}$-$V_{drop6}$ to output a minimum voltage level $V_N$ to the second input end 314 of the voltage regulator circuit 310. The driving voltage $V_{DD}$ can be adjusted according to the minimum voltage level $V_N$ (the feedback signal FB). Because the minimum voltage level among the six voltage levels $V_{drop1}$-$V_{drop6}$ is corresponding to the maximum forward bias voltage of the voltage level $V_{f1}$-$V_{f6}$, in other words, the selecting circuit 350 selects the maximum forward bias voltage among the six forward bias voltages $V_{f1}$-$V_{f6}$ to generate the feedback signal FB.

Assuming that the driving voltage $V_{DD}$ keeps raising and is greater than the second reference voltage Vref2, the analysis and decision circuit 360 will utilize the six open-circuit detectors 381-386 to check the status of the corresponding light-emitting device. If any light-emitting device is detected as open-circuit, the control logic will turn off the corresponding switch. For example, if the status of the second light-emitting device 322 is detected as an open-circuit, the second switch SW2 is turned off by the second switch control signal Ss2. Under this situation, all the six voltage levels $V_{drop1}$-$V_{drop6}$ except the second voltage level $V_{drop2}$ are transmitted to the select circuit 350. Thus the select circuit 350 selects the smallest of the five voltage levels to be the feedback signal FB. Due to the second light-emitting device 322 being detected as an open-circuit, the second voltage level $V_{drop2}$ (about 0V in this condition) is removed from the selection of the select circuit 350 for preventing the second voltage level $V_{drop2}$ from affecting the feedback signal FB. Therefore, the driving voltage $V_{DD}$ cannot go so far to keep raising all the time. The whole driving circuit 300 or its elements are protected from damage.

In one embodiment, the six light-emitting devices 321-326 may each include at least one light emitting diode (LED). The six constant-current suppliers 331-336 each can be a current sink or a current source. The second comparator COMP2 can be a hysteresis comparator for avoiding error actions. Furthermore, the number of the light-emitting devices is not restricted to six only, and can be any number.

Please note that, the abovementioned second comparator COMP2 is merely one embodiment for illustrating the analysis and decision circuit 360, and should not be a limitation of the present invention. Those skilled in the art should appreciate that various modifications of the analysis and decision circuit 360 can be made.

Figure 4:
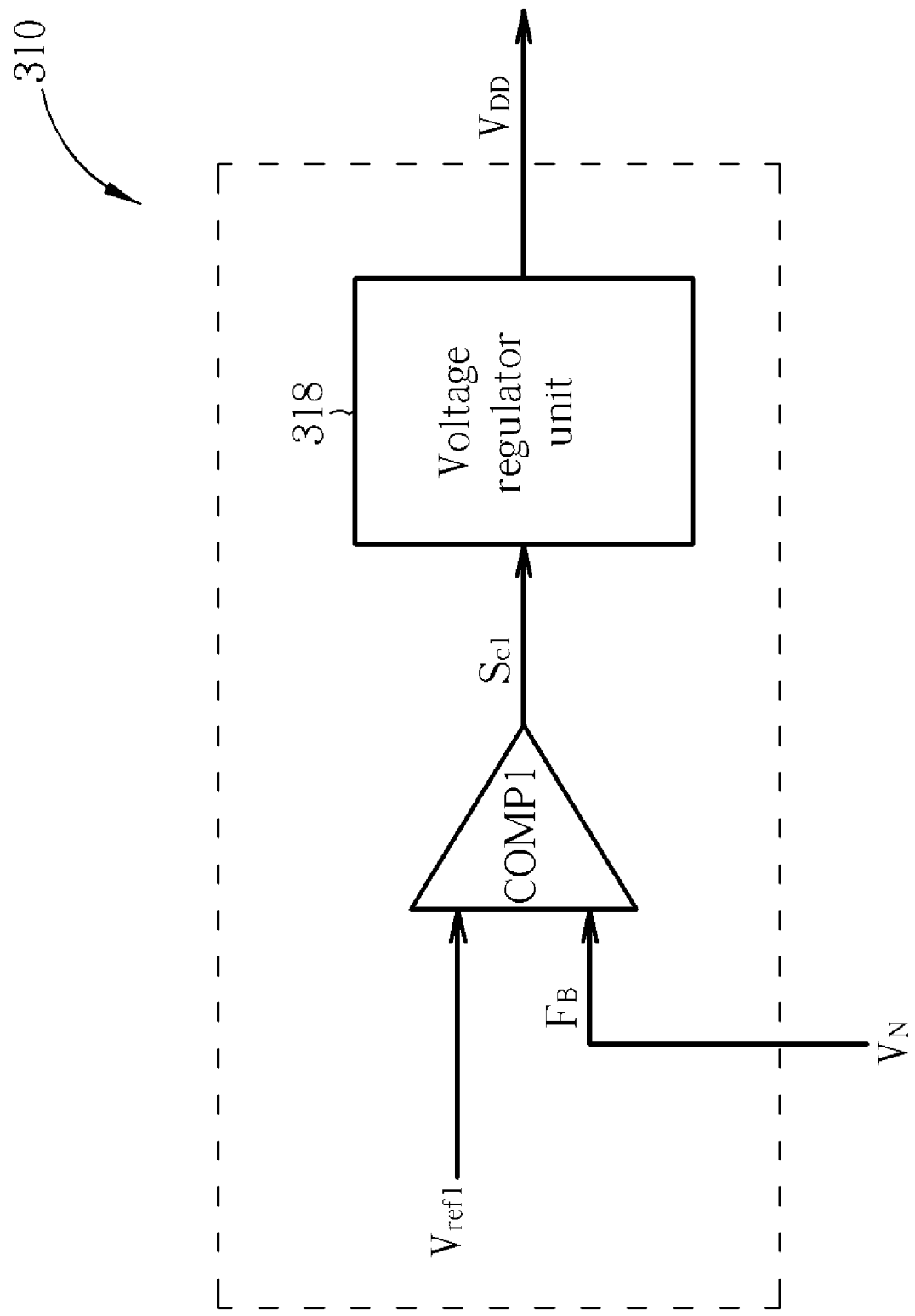
FIG. 4 is a diagram of the voltage regulator circuit in FIG. 3.

Please refer to FIG. 4 and FIG. 3. FIG. 4 is a diagram of the voltage regulator circuit 310 in FIG. 3. The voltage regulator circuit 310 includes a first comparator COMP1 and a voltage regulator unit 318. The first comparator COMP1 has a first input end for receiving the feedback signal FB and a second input end for receiving a first reference voltage Vref1. The first comparator COMP1 compares the feedback signal FB with the first reference voltage Vref1 to output a first comparison signal Sc1. The voltage regulator unit 318 is used for providing the driving voltage $V_{DD}$ to the six light-emitting devices 321-326 (shown in FIG. 3) and for dynamically adjusting the driving voltage $V_{DD}$ according to the first comparison signal Sc1 outputted from the first comparator COMP1. For example, if the feedback signal FB is greater than the first reference voltage Vref1, the first comparator COMP1 will output the first comparison signal Sc1 to control the voltage regulator unit 318 to reduce the driving voltage $V_{DD}$ until the voltage level $V_N$ is equal to the first reference voltage Vref1. If the feedback signal FB is smaller than the first reference voltage Vref1, the first comparator COMP1 will control the voltage regulator unit 318 to increase the driving voltage $V_{DD}$ until the voltage level $V_N$ is equal to the first reference voltage Vref1. In general, the voltage regulator circuit 310 can be implemented by any conventional power supply or driving chip of the light-emitting device, that is, the voltage regulator circuit 310 can output the desired driving voltage $V_{DD}$ according to an alternating current source or a direct current source.

Figure 5:
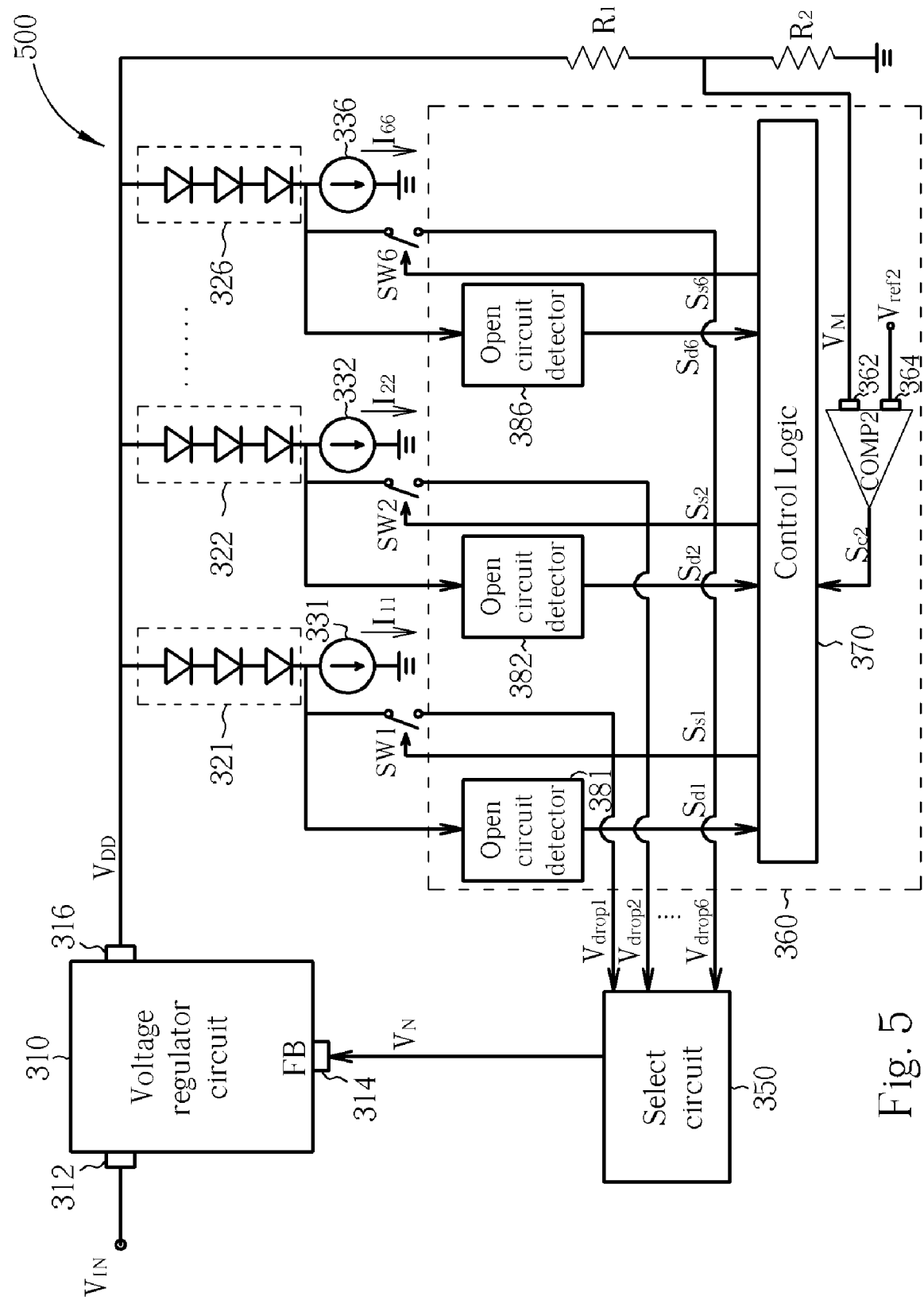
FIG. 5 is a diagram of a driving circuit for providing feedback control and open-circuit protection according to a second embodiment of the present invention.

Please refer to FIG. 5, which is a diagram of a driving circuit 500 for providing feedback control and open-circuit protection according to a second embodiment of the present invention. The driving circuit 500 is similar to the driving circuit 300 in FIG. 3. The difference between them is that the driving voltage $V_{DD}$ is divided by a first resistor R1 and a second resistor R2 to generate a divided driving voltage $V_M$. Due to the driving voltage $V_{DD}$ always having a high level, a smaller divided driving voltage $V_M$ can be obtained after dividing the driving voltage $V_{DD}$. The second comparator COMP2 with a lower voltage is easier to be implemented. Please note that the driving circuit 500 is a variation of the first embodiment in FIG. 3, whereof the first resistor R1 and the second resistor R2 are just optional elements. This is only an embodiment and is not to limit practical applications of the present invention.

Figure 6:
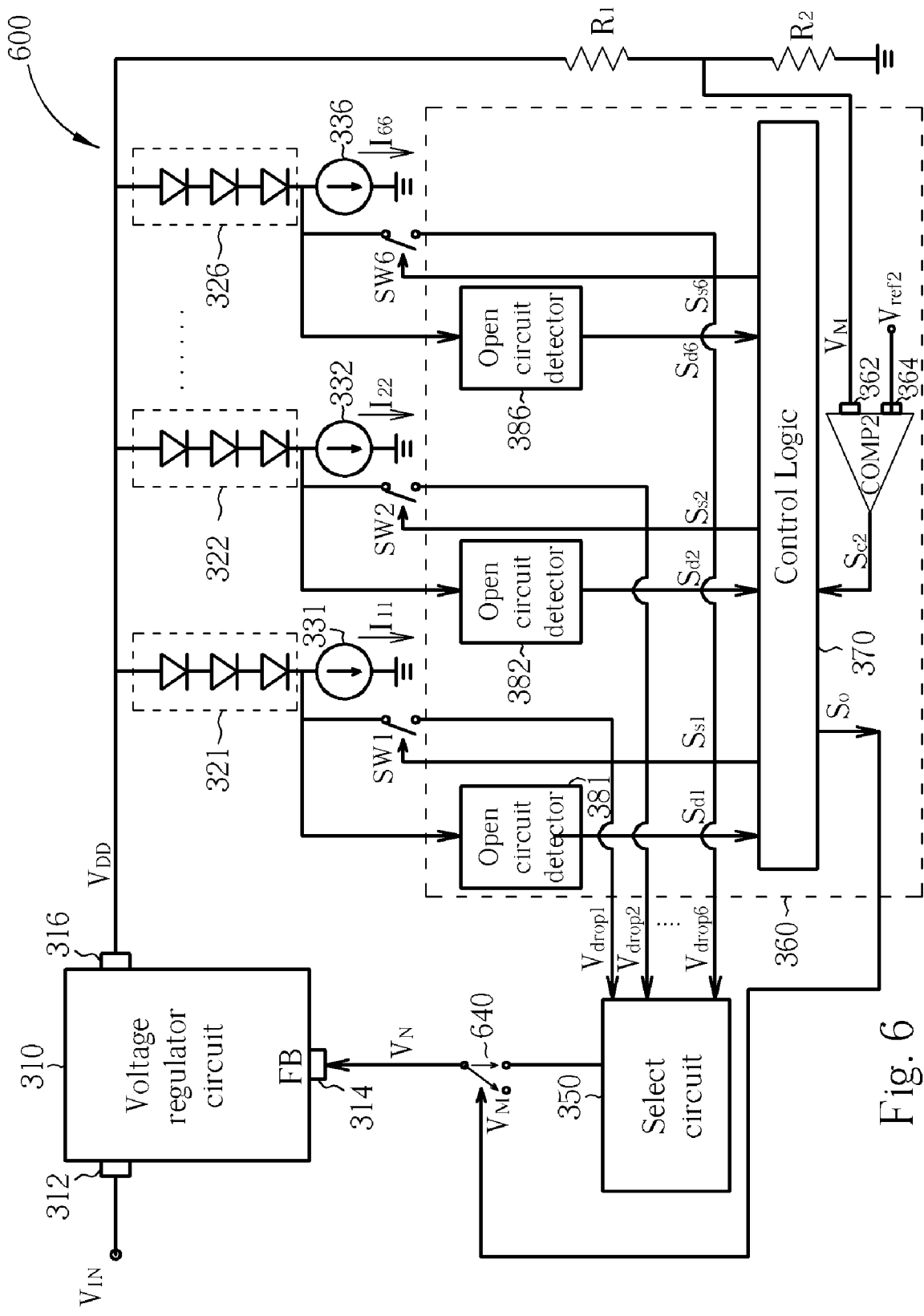
FIG. 6 is a diagram of a driving circuit for providing feedback control and open-circuit protection according to a third embodiment of the present invention.

Please refer to FIG. 6, which is a diagram of a driving circuit 600 for providing feedback control and open-circuit protection according to a third embodiment of the present invention. The driving circuit 600 is another variation of the first embodiment in FIG. 3. The differences between this variation and the previous variation are that the control logic 370 further includes an output end for outputting an output signal So. The output signal So is used for controlling a switch 640, whereof the output signal So being HIGH indicates that the statuses of all the light-emitting devices 321-326 are detected as open-circuit. At this time, the feedback signal FB is fixed at the voltage level $V_M$ if the statuses of all the light-emitting devices 321-326 are detected as open-circuit. Under this condition, the driving voltage $V_{DD}$ is clamped at a fixed voltage. Please note that the feedback signal FB can be clamped at any voltage level (can be set depending on user's demands), and the voltage level $V_M$ is only an embodiment for illustration. Furthermore, implementations of the feedback signal FB and the driving voltage $V_{DD}$ are well known by a person skilled in the art, and therefore additional details of the relative operations are not explained anymore.

Figure 7:
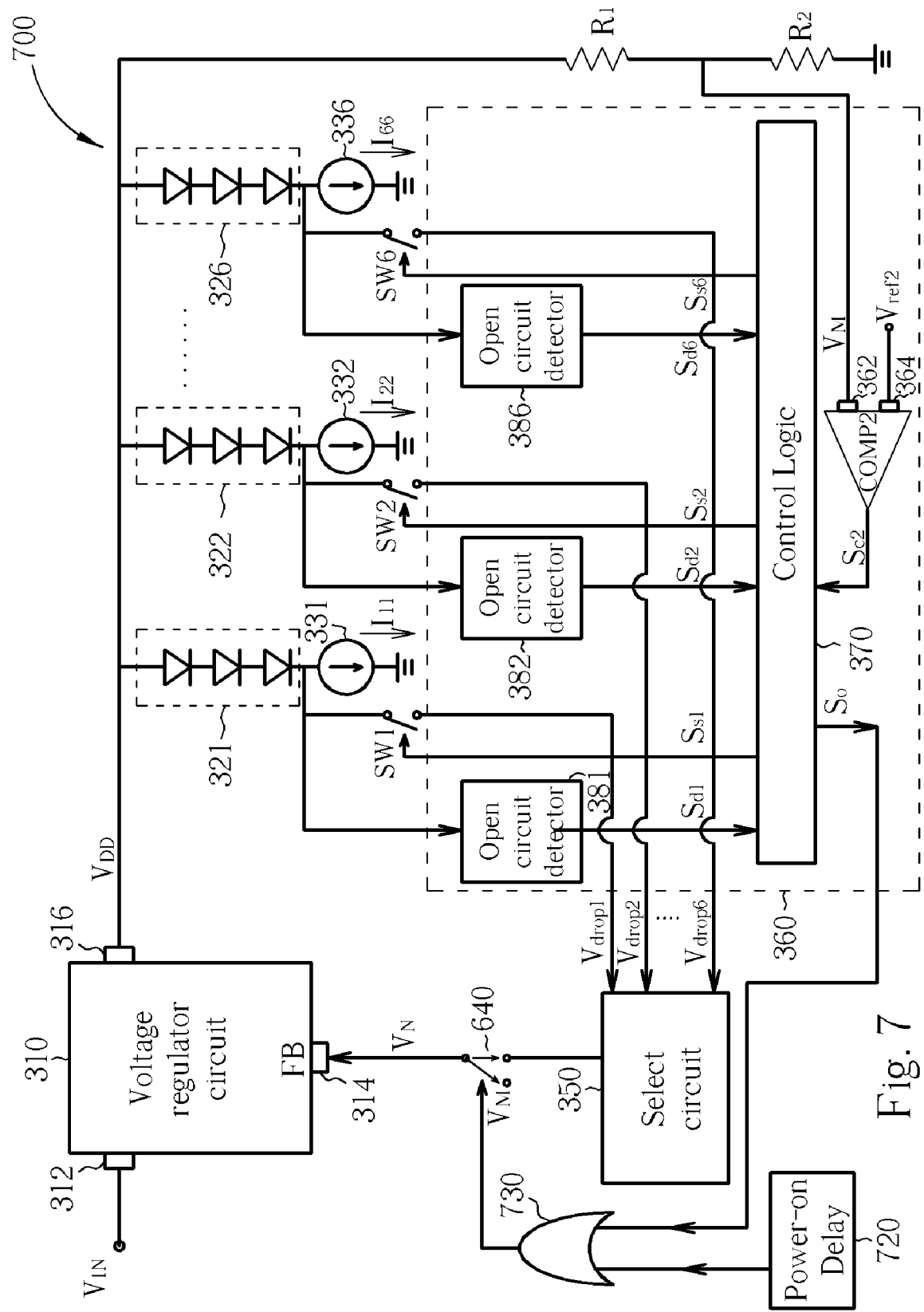
FIG. 7 is a diagram of a driving circuit for providing feedback control and open-circuit protection according to a forth embodiment of the present invention.

Please refer to FIG. 7 and FIG. 6. FIG. 7 is a diagram of a driving circuit 700 for providing feedback control and open-circuit protection according to a fourth embodiment of the present invention. The driving circuit 700 is a variation of the third embodiment in FIG. 6. The differences between them are described as follows. The driving circuit 700 further includes a power-on delay 720 and an OR gate 730. The power-on delay 720 is used for making sure that the driving voltage $V_{DD}$ has reached a normal voltage level. If the abovementioned situation happened or the statuses of all the light-emitting devices 321-326 are detected as open-circuit, the OR gate 730 will output a signal to control the switch 640 to connect the feedback signal FB to the voltage level $V_M$. That is, the feedback signal FB is fixed at the voltage level $V_M$ if the statuses of all the light-emitting devices 321-326 are detected as open-circuit. Under this condition, the driving voltage $V_{DD}$ is clamped at a fixed voltage. Please note that the feedback signal FB can be clamped at any voltage level (can be set depending on user's demands), and the voltage level $V_M$ is only an embodiment for illustration. Furthermore, implementations of the feedback signal FB and the driving voltage $V_{DD}$ are well known by a person skilled in the art, and therefore additional details of the relative operations are not explained anymore.

Figure 8:
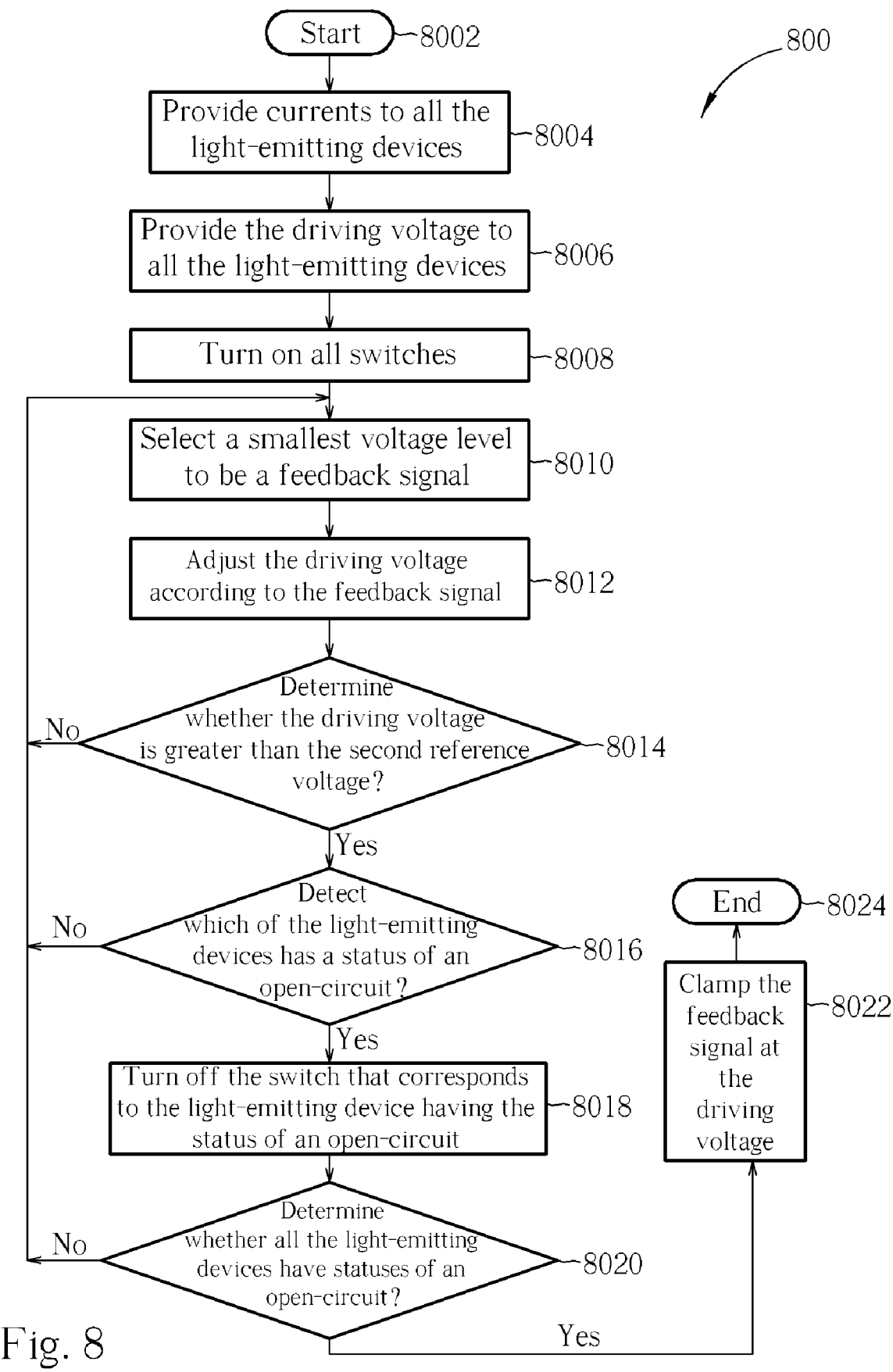
FIG. 8 is a diagram of a flow illustrating a driving method for providing feedback control and open-circuit protection according to an embodiment of the present invention.

Please refer to FIG. 8, which is a diagram of a flow 800 illustrating a driving method for providing feedback control and open-circuit protection according to an embodiment of the present invention. The flow 800 includes the following steps:

Step 8002: Process start.

Step 8004: Provide currents to all the light-emitting devices 321-326.

Step 8006: Provide the driving voltage $V_{DD}$ to all the light-emitting devices 321-326.

Step 8008: Turn on all switches SW1-SW6.

Step 8010: Select a smallest voltage level among voltage levels corresponding to an output end of the light-emitting devices to be a feedback signal FB.

Step 8012: Adjust the driving voltage $V_{DD}$ according to the feedback signal FB.

Step 8014: Determine whether the driving voltage $V_{DD}$ is greater than the second reference voltage Vref2. If the driving voltage $V_{DD}$ is greater than the second reference voltage Vref2, the process goes to step 8016; otherwise, the process goes back to step 8010.

Step 8016: Detect which of the light-emitting devices has a status of an open-circuit. If any of the light-emitting devices is detected as an open-circuit, the process goes to step 8018; otherwise, the process goes back to step 8010.

Step 8018: Turn off the switch that corresponds to the light-emitting device having the status of an open-circuit.

Step 8020: Determine whether all the light-emitting devices have statuses of an open-circuit. If all the light-emitting devices are detected as an open-circuit, the process goes to step 8022; otherwise, the process goes back to step 8010.

Step 8022: Clamp the feedback signal FB at the driving voltage $V_{DD}$.

Step 8024: Process end.

Please refer back to FIG. 3. In step 8004-8006, all the light-emitting devices 321-326 are provided currents by the constant-current suppliers 331-336 and are provided the driving voltage $V_{DD}$ by the voltage regulator circuit 310. In step 8008, all the switches SW1-SW6 are turned on in the beginning. At this time, all the voltage levels $V_{drop1}$-$V_{drop6}$ are transmitted to the select circuit 350, whereof a smallest voltage level among voltage levels $V_{drop1}$-$V_{drop6}$ is selected to be a feedback signal FB (step 8010). Hence, the driving voltage $V_{DD}$ is adjusted according to the feedback signal FB (step 8012). Afterwards, the second comparator COMP2 starts to compare the driving voltage $V_{DD}$ with the second reference voltage Vref2 (step 8014). If the driving voltage $V_{DD}$ is lower than the second reference voltage Vref2, the process goes back to step 8010 and all the switches remain turned on. If the driving voltage $V_{DD}$ is greater than the second reference voltage Vref2, the six open-circuit detectors 381-386 will detect the statuses of their respective corresponding light-emitting device to check if the light-emitting devices has the status of an open-circuit (step 8016). If none of the light-emitting devices is an open-circuit, the process goes back to step 8010. If any of the light-emitting devices are detected as an open-circuit, the corresponding switch is turned off (step 8018). That is, the voltage level corresponding to the light-emitting device having the status of an open-circuit is removed from the selection of the select circuit 350. Again, the select circuit 350 will select a smallest voltage level among all the output voltage levels corresponding to the light-emitting devices except this one having the status of an open-circuit to be the feedback signal FB (back to step 8010). Finally, the driving voltage $V_{DD}$ is adjusted according to the feedback signal FB. In another condition, if all the light-emitting devices are determined to have statuses of an open-circuit, the feedback signal FB is clamped at the driving voltage $V_{DD}$ (step 8020-8022). At this time, the process will exit the loop.

In one embodiment, the step 8012 may further include several steps:

Step 8102: Compare the feedback signal FB with a first reference voltage Vref1. If the feedback signal is greater than the first reference voltage Verf1, the process goes to step 8104; otherwise, the process goes to step 8106.

Step 8104: Decrease the driving voltage $V_{DD}$.

Step 8106: Increase the driving voltage $V_{DD}$.

In one embodiment, the step 8014 can be replaced by the following steps:

Step 8202: Divide the driving voltage $V_{DD}$ to generate a divided driving voltage $V_M$.

Step 8204: Compare the divided driving voltage $V_M$ with the second reference voltage Vref2.

Step 8206: Determine whether the divided driving voltage $V_M$ is greater than the second reference voltage Vref2. If the divided driving voltage $V_M$ is greater than the second reference voltage Vref2, the process goes to step 8016; otherwise, the process goes back to step 8014.

Please note that the sequence of the steps in FIG. 8 is not unalterable, for example, step 8004 and step 8006 can be combined into one step.

The abovementioned embodiments are presented merely for describing the present invention, and in no way should be considered to be limitations of the scope of the present invention. The abovementioned light-emitting devices 321-326 may each include at least one light emitting diode (LED) The number of the light-emitting devices is not restricted to six only, and can be expanded to any number. The constant-current suppliers 331-336 each can be a current sink, a current source, or constant-current supplier in other types. The second comparator COMP2 is not restricted to a hysteresis comparator only, and can be other comparators. In addition, the voltage regulator circuit 310 can be implemented by any conventional power supply or driving chip of the light-emitting device. Please note that the driving circuit 500 and the driving circuit 400 are just the variations of the first embodiment in FIG. 3, whereof these elements, such as the first resistor R1, the second resistor R2, the power-on delay 720, the OR gate 730, and the switch 640 are just optional elements to provide additional benefits. They are only embodiments and are not to limit practical applications of the present invention. Furthermore, the sequence of the steps in FIG. 8 is not unalterable and can be adjusted.

In summary, the present invention provides a driving circuit for providing feedback control and open-circuit protection. Through the driving circuits disclosed in the present invention, not only can the feedback signal FB can be controlled to provide a suitable driving voltage $V_{DD}$ but also the status of an open-circuit can be detected. Especially as for a driving circuit needing to drive a large number of light-emitting devices, the present invention can provide enough driving voltage (enough current) to drive all the light-emitting devices. Besides, the select circuit 350 can select the smallest voltage level among the voltage levels $V_{drop1}$-$V_{drop6}$ (i.e., the biggest voltage level among the forward bias voltages $V_{f1}$-$V_{f6}$ to be the feedback signal FB, which can reduce the power consumption for each constant current supplier 331-336. If any light-emitting device is burned out (or open-circuited), the analysis and decision circuit 360 will detect the status of an open-circuit and remove it from the selection candidates of the select circuit 350. Thus whole driving circuit and its elements can be protected from damage.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driving circuit for providing feedback control and open-circuit protection, the driving circuit comprising:
   at least one light-emitting device;
   a voltage regulator circuit, coupled to the light-emitting device, for providing a driving voltage to drive the light-emitting device;

a first resistor, coupled to the output end of the voltage regulator circuit;

a second resistor, coupled to the first resistor in series, wherein the first resistor and the second resistor are used for dividing the driving voltage to generate a divided driving voltage;

an analysis and decision circuit, coupled to the light-emitting device, for determining whether the light-emitting device is open-circuit to generate a decision result, wherein the analysis and decision circuit comprises:

a second comparator, having a first input end coupled to a joint point of the first resistor and the second resistor for receiving the divided driving voltage and a second input end for receiving a second reference voltage, the second comparator used for comparing the divided driving voltage with the second reference voltage to generate a second comparison signal;

at least one open-circuit detector, having an input end coupled to the light-emitting device and an output end for outputting a detection signal, the open-circuit detector used for detecting a status of the light-emitting device; and a control logic, coupled to the output end of the second comparator and the output end of the open-circuit detector, the control logic used for generating the decision result according to the second comparison signal and the detection signal; and a selecting circuit, coupled between the analysis and decision circuit and the voltage regulator circuit, for selecting a maximum forward bias voltage corresponding to the light-emitting device to generate a feedback signal according to the decision result and for transmitting the feedback signal to the voltage regulator circuit, wherein the voltage regulator circuit adjusts the driving voltage according to the feedback signal.

2. The driving circuit of claim 1, wherein the light-emitting device comprises at least one light emitting diode (LED).

3. The driving circuit of claim 1, wherein the voltage regulator circuit comprises:

a first comparator used for comparing the feedback signal with a first reference voltage to output a first comparison signal; and a voltage regulator unit coupled to the first comparator for adjusting the driving voltage according to the first comparison signal.

4. The driving circuit of claim 3, wherein the first comparison signal outputted by the first comparator controls the voltage regulator unit to decrease the driving voltage if the feedback signal is greater than the first reference voltage and controls the voltage regulator unit to increase the driving voltage if the feedback signal is lower than the first reference voltage.

5. The driving circuit of claim 1, wherein the second comparator is a hysteresis comparator.

6. The driving circuit of claim 1, wherein:

the second comparison signal outputted by the second comparator controls turning on the switch if the divided driving voltage is lower than the second reference voltage; and the second comparison signal outputted by the second comparator controls turning off the corresponding switch if the divided driving voltage is greater than the second reference voltage and the light-emitting device is detected as open-circuit.

7. The driving circuit of claim 1, wherein the control logic clamps the feedback signal at a fixed voltage level if each of the light-emitting device is detected as open-circuit.

8. The driving circuit of claim 7, wherein the fixed voltage level comprises the driving voltage or the divided driving voltage.

9. The driving circuit of claim 1, further comprising:

at least one switch, coupled to the light-emitting device, the control logic, and the selecting circuit, the switch is controlled to be turned on or off according to the decision result.

10. A driving method for providing feedback control and open-circuit protection, the driving method comprising:

providing a driving voltage to drive at least one light-emitting device;

dividing the driving voltage to generate a divided driving voltage;

comparing the divided driving voltage with a second reference voltage to generate a second comparison signal;

detecting a status of the light-emitting device to output a detection signal;

determining whether the light-emitting device is open-circuit to generate a decision result according to the second comparison signal and the detection signal;

selecting a maximum forward bias voltage corresponding to the light-emitting device to generate a feedback signal according to the decision result; and adjusting the driving voltage according to the feedback signal.

11. The driving method of claim 10, wherein the light-emitting device comprises at least one light emitting diode (LED).

12. The driving method of claim 10, wherein the step of adjusting the driving voltage according to the feedback signal further comprises:

comparing the feedback signal with a first reference voltage to generate a first comparison signal; and adjusting the driving voltage according to the first comparison signal.

13. The driving method of claim 12, wherein the step of comparing the feedback signal with a first reference voltage to adjust the driving voltage further comprises:

decreasing the driving voltage if the feedback signal is greater than the first reference voltage; and increasing the driving voltage if the feedback signal is lower than the first reference voltage.

14. The driving method of claim 10, wherein the step of determining whether the light-emitting device is open-circuit to generate the decision result according to the second comparison signal and the detection signal comprises:

turning on the at least one switch corresponding to the light-emitting device if the divided driving voltage is lower than the second reference voltage; and turning off the switch corresponding to the light-emitting device if the divided driving voltage is greater than the second reference voltage and the light-emitting device is detected as open-circuit.

15. The driving method of claim 10, further comprising:

clamping the feedback signal at a fixed voltage level if the status of each of the light-emitting device is detected as open-circuit.

16. The driving method of claim 15, wherein the fixed voltage level comprises the driving voltage or the divided driving voltage.

17. A driving circuit for providing feedback control and open-circuit protection, the driving circuit comprising:

at least one light-emitting device;

a voltage regulator circuit, coupled to the light-emitting device, for providing a driving voltage to drive the light-emitting device;

an analysis and decision circuit, coupled to the light-emitting device, for determining whether the light-emitting device is open-circuit to generate a decision result, wherein the analysis and decision circuit comprises:
- a comparator, having a first input end for receiving the driving voltage and a second input end for receiving a reference voltage, the comparator used for comparing the driving voltage with the reference voltage to generate a second comparison signal;
- at least one open-circuit detector, having an input end coupled to the light-emitting device and an output end for outputting a detection signal, the open-circuit detector used for detecting a status of the light-emitting device; and
- a control logic, coupled to the output end of the comparator and the output end of the open-circuit detector, the control logic used for generating the decision result according to the comparison signal and the detection signal; and a selecting circuit, coupled between the analysis and decision circuit and the voltage regulator circuit, for selecting a maximum forward bias voltage corresponding to the light-emitting device to generate a feedback signal according to the decision result and for transmitting the feedback signal to the voltage regulator circuit, wherein the voltage regulator circuit adjusts the driving voltage according to the feedback signal.

18. A driving method for providing feedback control and open-circuit protection, the driving method comprising:
- providing a driving voltage to drive at least one light-emitting device;
- comparing the driving voltage with a reference voltage to generate a comparison signal;
- detecting a status of the light-emitting device to output a detection signal;
- determining whether the light-emitting device is open-circuit to generate a decision result according to the comparison signal and the detection signal;
- selecting a maximum forward bias voltage corresponding to the light-emitting device to generate a feedback signal according to the decision result; and
- adjusting the driving voltage according to the feedback signal.

* * * * *